United States Patent
Konradsson et al.

(10) Patent No.: US 10,454,747 B1
(45) Date of Patent: Oct. 22, 2019

(54) SYSTEMS AND METHODS FOR UP-SAMPLING A POLAR AMPLITUDE SAMPLE STREAM IN A POLAR MODULATOR

(71) Applicant: Innophase, Inc., San Diego, CA (US)

(72) Inventors: Per Konradsson, Järfälla (SE); Sara Munoz Hermoso, San Diego, CA (US)

(73) Assignee: Innophase, Inc., San Diego, CA (US)

( * ) Notice: Subject to any disclaimer, the term of this patent is extended or adjusted under 35 U.S.C. 154(b) by 0 days.

(21) Appl. No.: 16/125,475

(22) Filed: Sep. 7, 2018

(51) Int. Cl.
*H04L 27/20* (2006.01)
*H04L 27/36* (2006.01)
*H04L 27/34* (2006.01)

(52) U.S. Cl.
CPC ........ *H04L 27/361* (2013.01); *H04L 27/3405* (2013.01); *H04L 2203/00* (2013.01)

(58) Field of Classification Search
CPC ... H04L 27/361; H04L 27/362; H04B 1/0475; H03C 5/00; H03C 3/40
See application file for complete search history.

(56) References Cited

U.S. PATENT DOCUMENTS

| | | | |
|---|---|---|---|
| 7,945,223 B2 | 5/2011 | Lewis | |
| 8,160,515 B1* | 4/2012 | Husted | H03C 1/62 455/108 |
| 8,180,302 B2 | 5/2012 | Lewis | |
| 9,197,258 B1* | 11/2015 | Menkhoff | H04L 27/361 |
| 9,444,486 B2 | 9/2016 | Kuttner | |
| 2005/0046507 A1* | 3/2005 | Dent | H03C 3/40 332/103 |
| 2005/0136858 A1* | 6/2005 | Zipper | H03C 5/00 455/102 |
| 2009/0206940 A1* | 8/2009 | Collados Asensio | H03C 3/40 332/103 |
| 2010/0067617 A1* | 3/2010 | Wilhelm | H03C 5/00 375/308 |
| 2016/0094251 A1* | 3/2016 | Sahlin | H04B 1/04 375/302 |

OTHER PUBLICATIONS

Michael Fulde et. al.; "13.2 a digital multimode polar transmitter supporting 40MHz LTE Carrier Aggregation in 28nm CMOS"; 2017 IEEE International Solid-State Circuits Conference (ISSCC); IEEE; San Francisco, CA, USA; Mar. 6, 2017.

* cited by examiner

*Primary Examiner* — Aristocratis Fotakis
(74) *Attorney, Agent, or Firm* — Invention Mine LLC

(57) ABSTRACT

Systems and methods for up-sampling a polar amplitude sample stream in a polar modulator are disclosed. In some embodiments, a process includes receiving, at a polar modulator, an in-phase sample stream and a quadrature sample stream which together characterize a data signal in an IQ plane. The process includes generating a polar amplitude sample stream and a polar phase sample stream. The process includes generating an up-sampled polar amplitude sample stream by (i) identifying an origin crossing of the data signal in the IQ plane, (ii) responsively adjusting an inversion trigger, (iii) selectively applying an inversion to the polar amplitude sample stream based on the inversion trigger, (iv) interpolating the selectively inverted polar amplitude sample stream, and (v) removing the inversion from the interpolated selectively inverted polar amplitude sample stream. The process includes modulating a carrier signal using the up-sampled polar amplitude stream and the polar phase sample stream.

20 Claims, 4 Drawing Sheets

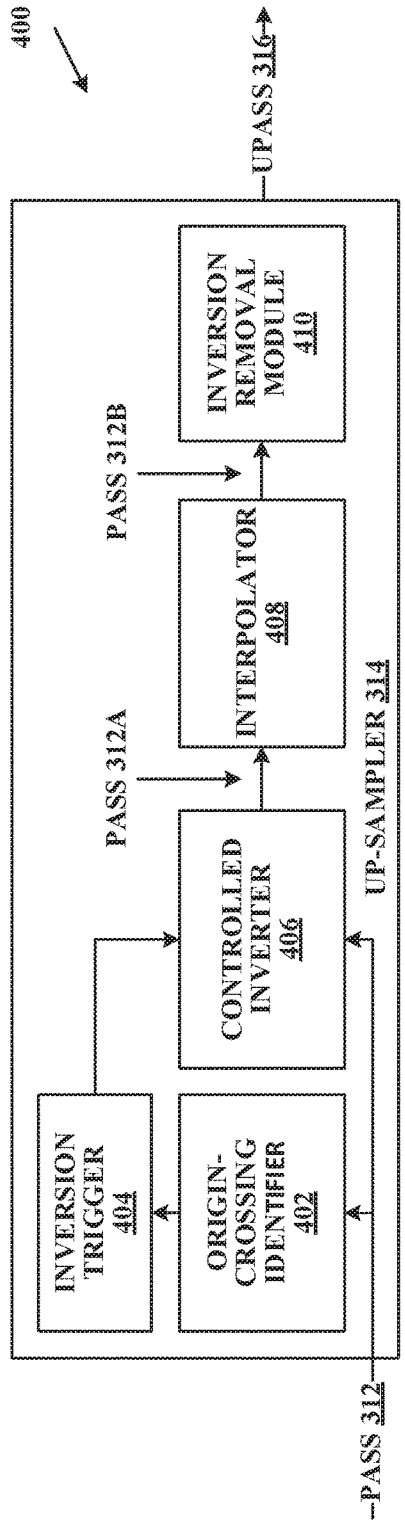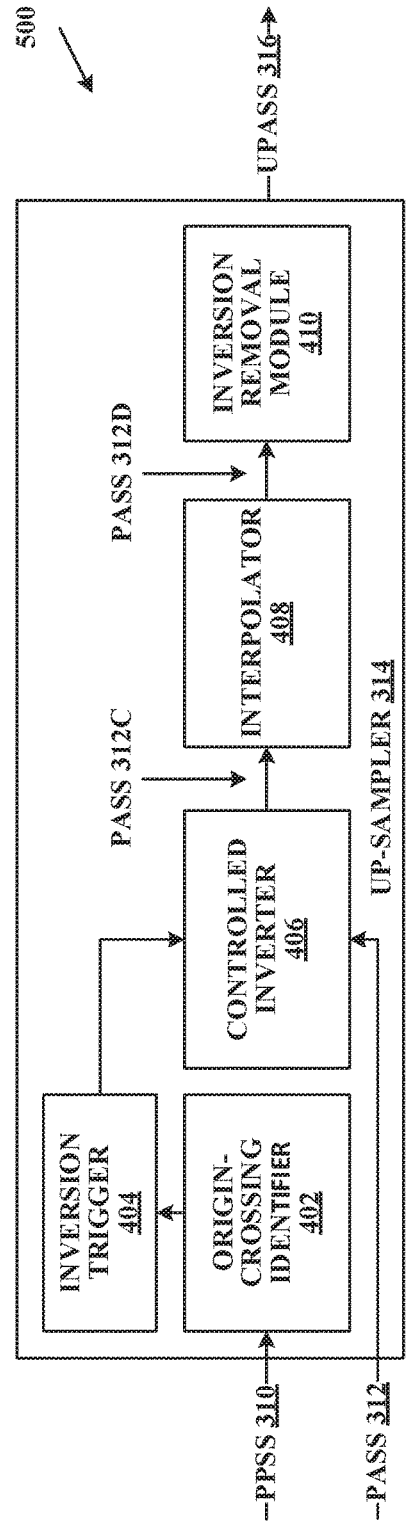

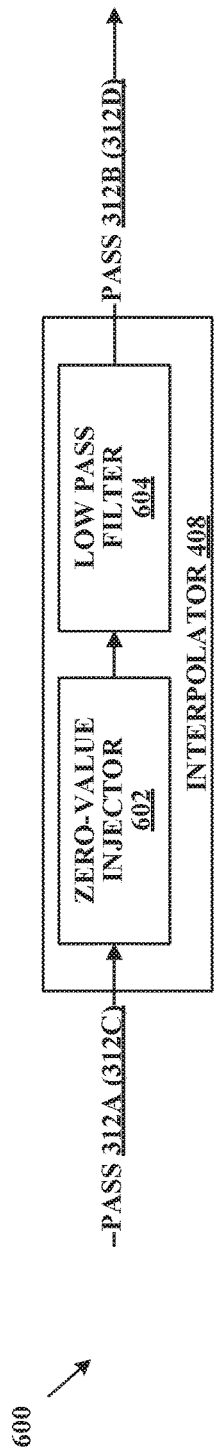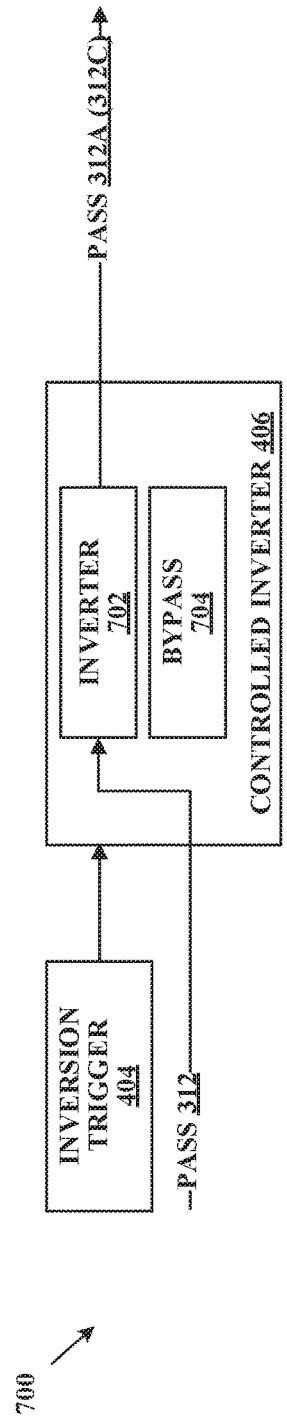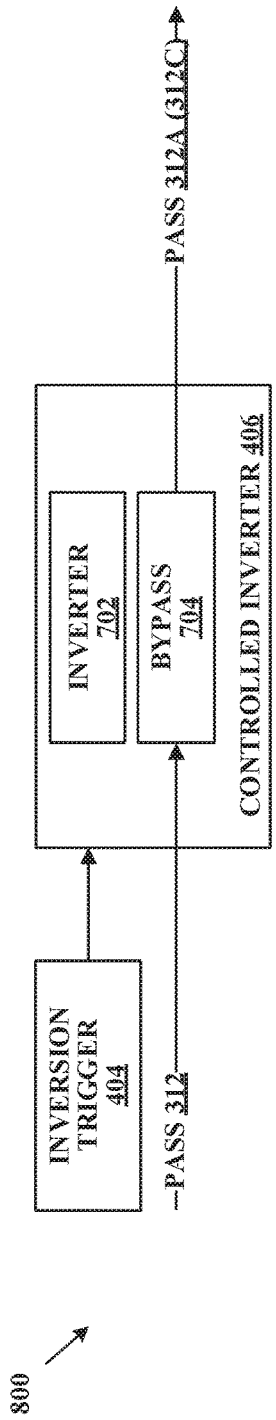

US 10,454,747 B1

SYSTEMS AND METHODS FOR UP-SAMPLING A POLAR AMPLITUDE SAMPLE STREAM IN A POLAR MODULATOR

BACKGROUND

Communication transceivers employ a large variety of data encoding schemas to transport information. Many transceivers employ functional architectures to encode digital data onto a carrier signal. Polar modulator architectures use data signals in the form of polar phase components and polar amplitude components and use these polar data signals to alter the phase and amplitude of a carrier signal. However, the polar data signals used in polar modulator architectures have characteristics that result in poor performance when transmitting at higher data sampling frequencies. Accordingly, there is a need for improvements to systems and methods related to polar modulator architectures.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts disclosed herein, and explain various principles and advantages of those embodiments.

FIG. 4 is a block diagram of a first example of the up-sampler of FIG. 3 in accordance with some embodiments.

FIG. 5 is a block diagram of a second example of the up-sampler of FIG. 3 in accordance with some embodiments.

FIG. 6 is a block diagram of an example of the interpolator of FIGS. 4 and 5 in accordance with some embodiments.

FIG. 7 depicts the controlled inverter and the inversion trigger of FIG. 4 or FIG. 5 with the inversion trigger in an active state in accordance with some embodiments.

FIG. 8 depicts the controlled inverter and the inversion trigger of FIG. 4 or FIG. 5 with the inversion trigger in an inactive state in accordance with some embodiments.

Figure 1:
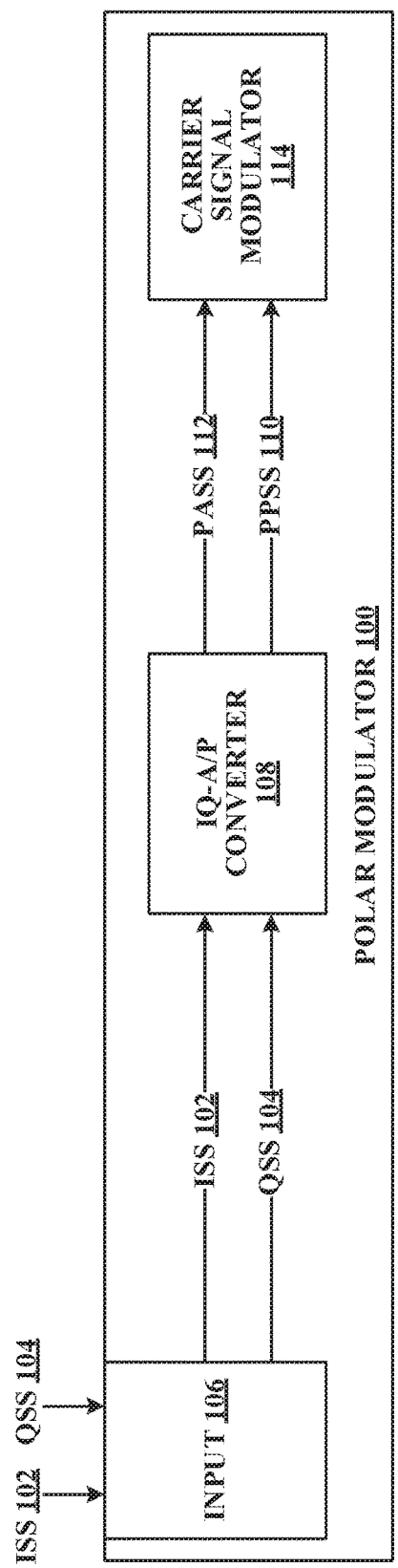
FIG. 1 is a block diagram of a prior art polar modulator.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed herein are methods and systems for signal processing in a polar modulator. One embodiment takes the form of a process that includes receiving an in-phase sample stream and a quadrature sample stream at a polar modulator, wherein the in-phase sample stream and the quadrature sample stream together characterize a data signal in an IQ plane. The process also includes generating a polar amplitude sample stream and a polar phase sample stream based on the in-phase sample stream and the quadrature sample stream. The process also includes generating an up-sampled polar amplitude sample stream at least in part by (i) identifying an origin crossing of the data signal in the IQ plane and responsively adjusting an inversion trigger, (ii) selectively applying an inversion to the polar amplitude sample stream based on the inversion trigger to form a selectively inverted polar amplitude sample stream, (iii) interpolating the selectively inverted polar amplitude sample stream to form an interpolated selectively inverted polar amplitude sample stream, and (iv) removing the inversion from the interpolated polar amplitude sample stream to form the up-sampled polar amplitude sample stream. The process also includes modulating a carrier signal, at the polar modulator, using the up-sampled polar amplitude sample stream and the polar phase sample stream.

Another embodiment takes the form of a system that includes a communication interface, a processor, and data storage containing instructions executable by the processor for causing the system to carry out at least the acts or features described in the preceding paragraph.

In at least one embodiment, the data signal is a phase shift keying (PSK) signal, such as a BPSK, or QPSK data signal.

In at least one embodiment, generating the polar amplitude sample stream and the polar phase sample stream includes employing a look-up table.

In at least one embodiment, generating the polar amplitude sample stream and the polar phase sample stream includes employing a CORDIC.

In at least one embodiment, identifying the origin crossing of the data signal in the IQ plane includes identifying a π radian shift in the polar phase sample stream, or identifying a phase shift θ in the polar phase sample stream that is within a range of a π radian shift, such as $\|\theta|-\pi|\leq\pi/4$. In some embodiments, a broader range may be used, depending on the design, such as, e.g., $0\leq\|\theta|-\pi|\leq\pi/2$.

In at least one embodiment, identifying the origin crossing of the data signal in the IQ plane includes identifying the polar amplitude sample stream being less than a threshold amplitude value.

In at least one embodiment, the inversion trigger is a two-state system, the two-state system including an active state and an inactive state, and adjusting the inversion trigger includes switching the state of the inversion trigger between the active state and the inactive state. That is, adjusting the inversion trigger causes the state of the inversion trigger to toggle from the active state to the inactive state or from the inactive state to the active state. In at least one such embodiment, selectively applying the inversion to the polar amplitude sample stream based on the inversion trigger includes (i) applying the inversion to the polar amplitude sample stream while the inversion trigger is in the active state and (ii) not applying the inversion to the polar amplitude sample stream while the inversion trigger is in the inactive state. In some embodiments, the inversion is implemented by an up-sampler circuit.

In at least one embodiment, interpolating the polar amplitude sample stream includes (i) injecting 0-value (zero-value) samples into the selectively inverted polar amplitude sample stream, and (ii) applying a low-pass filter to the (injected) selectively inverted polar amplitude sample stream to form an interpolated selectively inverted amplitude stream. In at least one embodiment, interpolating the polar amplitude sample stream includes using a poly-phase finite impulse response (FIR) filter to generate the up-sampled signal.

In at least one embodiment, removing the inversion from the interpolated selectively inverted polar amplitude sample stream includes taking an absolute value of the interpolated selectively inverted polar amplitude sample stream. In some embodiments, removing the inversion is implemented by an up-sampler circuit.

Variations and permutations described in the following paragraphs and anywhere else in this disclosure can be implemented with respect to any embodiments, including with respect to any method embodiments and with respect to any system embodiments.

In some system embodiments, a specific functional architecture may be described. In at least one embodiment, the system takes the form of a polar modulator. In at least one embodiment, the polar modulator includes an input, a coordinate system converter, an up-sampler, and a carrier-signal modulator.

In at least one embodiment, the system includes an input configured to receive an in-phase sample stream and a quadrature sample stream. The in-phase sample stream and the quadrature sample stream together characterize a data signal in an IQ plane. In at least one embodiment, the data signal is a phase shift keying (PSK) signal, such as a BPSK, or QPSK data signal.

In at least one embodiment, the system further includes a coordinate system converter such as an in-phase quadrature to amplitude/phase (IQ-A/P) converter configured to receive the in-phase sample stream and the quadrature sample stream from the input and to generate a polar amplitude sample stream and a polar phase sample stream. In at least one embodiment, the IQ-A/P converter is configured to employ a look-up table to generate the polar amplitude sample stream and the polar phase sample stream. In at least one embodiment the IQ-A/P converter is configured to employ to look-up table to translate IQ coordinates into the polar phase sample stream. In at least one embodiment, the IQ-A/P converter employs a CORDIC circuit to generate the polar amplitude sample stream and the polar phase sample stream. In at least one embodiment, the IQ-A/P converter employs a look-up-table that maps IQ coordinate ranges to predefined phase values.

The system further includes an up-sampler configured to receive the polar amplitude sample stream from coordinate system converter (e.g., the IQ-A/P converter) and to generate an up-sampled polar amplitude sample stream. Before proceeding with a discussion regarding the functional elements within the up-sampler of the present disclosure, the motivation for such an up-sampler will be provided in a general sense. In a given polar modulator, the sensitivity of the polar modulator could be high enough to require data stream up-sampling of the polar amplitude sample stream or polar phase sample stream for proper modulation.

The polar amplitude sample stream is a stream of consecutive samples of digitally encoded polar amplitude values. Each polar amplitude value is encoded as a binary word, in accordance with the utilized binary data formatting. In one embodiment, the data samples take the form of signed or two's complement binary data. More particularly, in one embodiment, a CORDIC processor receives unsigned values and converts them to signed binary data. Although QPSK symbol values have uniform magnitudes in each quadrant of the IQ plane, the magnitudes could vary from a constant envelope value as the signal transitions between symbols. Although transitions between adjacent QPSK symbols (i.e., 90-degree phase changes) can provide smaller magnitude deviations, during a 180-degree phase transition, the magnitude rapidly dips towards zero followed by a rapid increase, forming a cusp discontinuity in the polar amplitude data signal sequence.

Likewise, during a phase discontinuity when a signal transitions between $\pi$ and $2\pi$, the phase change causes a phase-wrap jump discontinuity in the data signal sequence. These non-linear aspects of the polar signal conversion create discontinuities in the data signal.

Some embodiments herein provide for up-sampling the polar amplitude sample stream using interpolation. One example of a common and efficient interpolator is a windowed average FIR filter operating on a zero-filled sample stream, which may also take the form of a poly-phase FIR filter. Unfortunately, a windowed averager will not produce precise and accurate results when interpolating around the signal discontinuities associated with amplitude cusps and phase-wrap jumps (e.g., the signal transitions described above with respect to certain QPSK symbols that require an origin crossing in the IQ plane) of a polar signal. The discontinuity in the cusps or wraps implies a great deal of high frequency information, introducing further complications into the signal processing. In some embodiments, in order to utilize standard interpolation processes, the above-mentioned issues associated with the rapid dips and rises in the polar amplitude sample stream may need to be addressed.

The polar phase sample stream includes consecutive samples of digitally encoded polar phase values bounded between $-\pi$ and $\pi$. Each polar phase value is encoded as a binary word, in accordance with the type of modulation chosen. A difference of substantially a radians between consecutive phase samples is associated with the rapid dip and rise in the polar amplitude sample stream. Both the rapid dip and rise in the polar amplitude sample stream and the a radian shift between consecutive phase samples indicate an origin crossing of a data signal in the IQ plane. Both are indications of a vector shrinking towards the origin from one direction and growing away from the origin in the opposite direction.

In at least one embodiment, an up-sampler includes an origin-crossing identifier, a controlled inverter, an interpolator, and an inversion removal module.

In at least one embodiment, an up-sampler includes an origin-crossing identifier configured to identify an origin crossing of the data signal in the IQ plane and responsively adjust an inversion trigger based on the identification of the origin crossing. In at least one such embodiment, the origin-crossing identifier is configured to identify the polar amplitude sample stream as being less than a threshold amplitude value (e.g., the polar amplitude approaches zero in absolute value terms, indicating an origin crossing in the IQ plane). In at least one embodiment, the up-sampler is configured to receive the polar phase sample stream from the IQ-A/P converter and the origin-crossing identifier identifies a $\pi$ radian shift in the polar phase sample stream. In at least one embodiment, a combination of the two above-described origin-crossing identification types is employed.

In at least some embodiments, when an origin crossing is identified, the inversion trigger is adjusted. In at least one embodiment, the inversion trigger is a two-state system, e.g., a binary two-state system, the two-state system including an active state and an inactive state, and the origin-crossing identifier being configured to responsively adjust the inversion trigger may include an origin-crossing identifier being configured to negate the state of the inversion trigger. In some embodiments more than two states may be used. In some embodiments, the inversion trigger can be used as a control signal for a controlled inverter being fed the polar amplitude sample stream. When the origin-crossing identifier determines that an origin-crossing has occurred, it flips the state of the controlled inverter via the inversion trigger. The controlled inverter remains in such a state until the origin-crossing identifier again detects an origin crossing and responsively flips the state of the controlled inverter via the inversion trigger.

In at least one embodiment, the up-sampler includes a controlled inverter configured to selectively apply an inversion to the polar amplitude sample stream based on the inversion trigger to form a selectively inverted polar amplitude sample stream. According to at least one embodiment, the controlled inverter includes (i) an inverter configured to invert the polar amplitude sample stream while the state of the inversion trigger is in the active state, and (ii) a bypass configured to transport the polar amplitude sample stream unmodified while the state of the inversion trigger is in the inactive state. The controlled inverter described herein can be activated or deactivated at each origin-crossing identification. The controlled inverter removes the cusps associated with the rapid dips and rises in the polar amplitude sample stream by extending parts of the sample stream, for example extending parts by allowing the polar amplitude sample stream to take on negative values.

In at least one embodiment, the up-sampler includes an interpolator configured to receive the selectively inverted polar amplitude sample stream from the controlled inverter and to interpolate the selectively inverted polar amplitude sample stream to form an interpolated selectively inverted polar amplitude sample stream. In one such embodiment, the interpolator includes (i) a 0-value (zero-value) injector configured to inject 0-value (zero-value) samples into the selectively inverted polar amplitude sample stream; and, (ii) a low-pass filter. The interpolator is described in general terms, and actual embodiments may include polyphase filtering operations. As a corollary, such a low-pass filter removes any high frequency information resulting from a cusp in the polar amplitude sample stream, thereby creating interpolation artifacts. Using a controlled inverter nullifies this concern by artificially removing the cusps (and the associated high frequency information), allowing the cusps to be reinserted after interpolation. Stated another way, instead of the polar amplitude sample stream exhibiting a filtered smoothness that eliminates high frequency information associated with a cusp corresponding locally to an origin crossing in the IQ plane in the absence of inversion, the polar amplitude sample stream that has been inverted responsively to an identified origin crossing in the IQ plane, in accordance with some embodiments described herein, will itself pass through the origin and change from positive to negative (or negative to positive), with the high frequency information retained after interpolation (e.g., zero-filling and filtering) and removal of the inversion (i.e., reinsertion of the cusp).

In at least one embodiment, the up-sampler includes an inversion removal module configured to receive the interpolated selectively inverted polar amplitude sample stream from the interpolator and to remove the inversion to form the up-sampled polar amplitude sample stream. In at least one embodiment, removing the inversion includes removing any selectively applied inversion in the interpolated selectively inverted polar amplitude sample stream. In at least one embodiment, the inversion removal module is configured to set sign bits in the interpolated selectively inverted polar amplitude sample stream to positive. In at least one embodiment, the inversion removal module is configured to implement an absolute value circuit. In at least one embodiment, the inversion removal module includes timing circuitry configured to synchronize the controlled inverter with the origin-crossing identifier. In such an embodiment, the inversion removal module may be configured to be activated and deactivated in accordance with the inversion trigger.

In one embodiment, the system includes a carrier-signal modulator configured to receive the up-sampled polar amplitude sample stream and the polar phase sample stream and to modulate a carrier signal based on the up-sampled polar amplitude sample stream and the polar phase sample stream.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

With reference to FIG. 1, a block diagram of a prior art polar modulator 100, fundamental concepts regarding the relevant art are depicted. The polar modulator 100 includes an input 106 that is depicted as receiving an in-phase sample stream (ISS) 102 and a quadrature sample stream (QSS) 104. The ISS 102 and the QSS 104 together characterize a data signal in an in-phase-quadrature (IQ) plane. The data signal carries information encoded via a quadrature modulation technique. Quadrature modulation makes use of Cartesian coordinates, x and y. When considering quadrature modulation, the x-axis is hereinafter referred to as the "I" (in-phase) axis, and the y-axis is hereinafter referred to as the "Q" (quadrature) axis.

The quadrature modulator approach to digital radio transmission often requires a linear RF power amplifier that can create a design conflict between improving power efficiency and maintaining amplifier linearity. Compromising linearity causes degraded signal quality, usually by adjacent channel degradation, which can be a fundamental factor in limiting network performance and capacity. Additional problems with linear RF power amplifiers, including device parametric restrictions, temperature instability, power control accuracy, wideband noise and production yields are also common. On the other hand, compromising power efficiency increases power consumption (which reduces battery life in handheld devices) and generates more heat. The issue of linearity in a power amplifier can theoretically be mitigated by requiring that the input signal of the power amplifier be of a "constant envelope", that is, contain no amplitude variations.

Polar modulator 100 includes a coordinate system converter such as an in-phase-quadrature to amplitude/phase (IQ-A/P) converter 108 that receives the QSS 104 and the ISS 102 and responsively generates a polar phase sample stream (PPSS) 110 and a polar amplitude sample stream (PASS) 112. Polar modulation is analogous to quadrature modulation in the same way that polar coordinates are analogous to Cartesian coordinates. Polar modulation makes use of polar coordinates, r (amplitude) and Θ (phase). Converting from a quadrature modulation schema to a polar modulation schema may be carried out via a plurality of known techniques. Mathematically, the process relies upon trigonometry. The tangent of the phase Θ is equivalent to the value of the quadrature component (Q) divided by the value of the in-phase component (I), while the amplitude r is given by the square root of the sum of the squares of the quadrature and in-phase components (Q and I, respectively).

A carrier-signal modulator 114 receives the PPSS 110 and the PASS 112 from the IQ-A/P converter 108. At the carrier-signal modulator 114 data samples are encoded according to the PPSS 110, the PASS 112, and a predetermined modulation technique. At least one embodiment of the polar modulator 100 employs a quadrature phase-shift keying (QPSK) modulation technique at the carrier-signal modulator 114. QPSK is a form of Phase Shift Keying (PSK) in which two bits are modulated at once, selecting one of four possible carrier phase shifts (0, 90, 180, or 270 degrees). QPSK allows the signal to carry twice as much information as ordinary PSK using the same bandwidth.

FIG. 1, labeled "prior art", is included to provide a brief introduction to concepts that discussed hereafter in greater detail. The conceptual overview depicted in FIG. 1 is included to aid the reader in ascertaining an introductory understanding of the nature of this disclosure. It is provided by way of example and not limitation, as an introductory guide for the reader.

Figure 2:
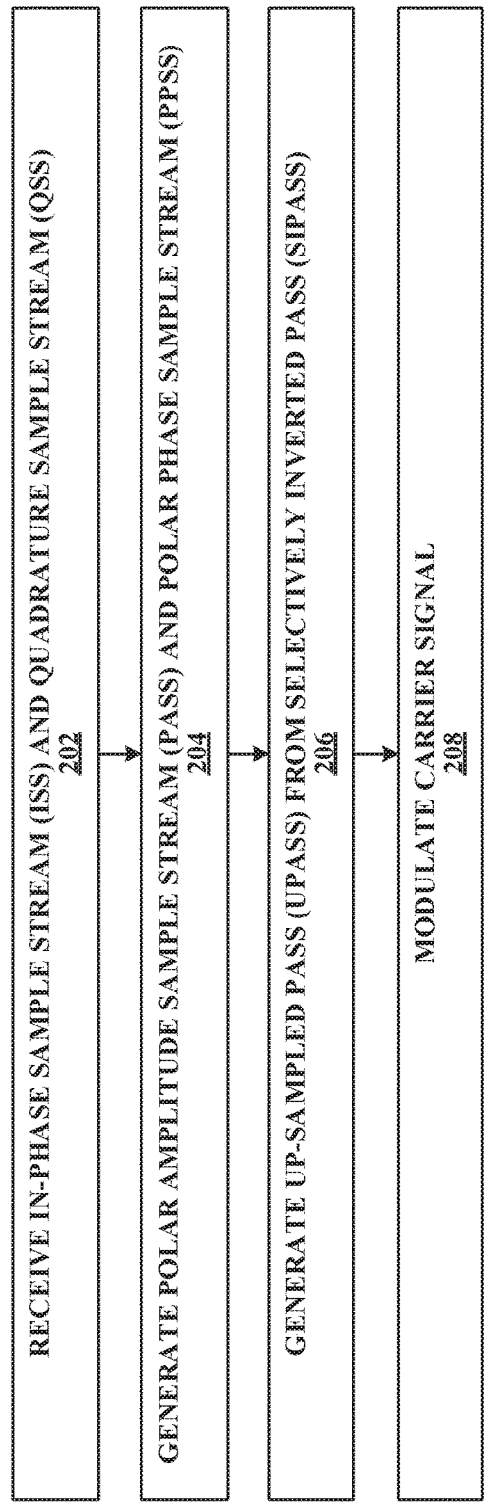
FIG. 2 is a flow chart of a method of up-sampling a polar amplitude stream in a polar modulator in accordance with some embodiments.

FIG. 2 is a flow chart of a method of up-sampling a polar amplitude stream in a polar modulator in accordance with some embodiments. In particular, FIG. 2 depicts a method 200 including elements 202, 204, 206, and 208. In at least one embodiment the method 200 is carried out by a polar modulator such as a polar modulator 300 described with respect to FIG. 3 below.

At element 202, method 200 includes receiving an ISS and a QSS. The ISS and the QSS of FIG. 2 may respectively take the form of the ISS 102 and the QSS 104 discussed in relation to FIG. 1. Together, the ISS and the QSS of FIG. 2 characterize a data signal in an IQ plane. The data signal may take the form of a digitally modulated discrete-time sample stream. A plurality of modulation schemas encode data into the ISS and the QSS using various techniques. In at least one embodiment, the data signal is a Quadrature Phase Shift Keying (QPSK) signal.

At element 204, the method 200 includes generating a PASS and a PPSS. The PASS and the PPSS of FIG. 2 may respectively take the form of the PPSS 110 and the PASS 112 discussed in relation to FIG. 1. The PASS and the PPSS are generated from the ISS and the QSS using a coordinate system converter such as an IQ-A/P converter. Converting from a quadrature modulation schema to a polar modulation schema may be carried out via a plurality of known techniques, for example employing an IQ-A/P converter such as the IQ-A/P converter 108 of FIG. 1. In at least one embodiment of the method 200, the element 204 generates the PASS and the PPSS by employing a look-up-table that maps IQ coordinate ranges to predefined phase values. In at least one other embodiment of the method 200, the element 204 generates the PASS and the PPSS by employing a COordinate Rotation Digital Computer (CORDIC) algorithm or circuit. As will be appreciated by one of ordinary skill in the art, a vast number of techniques can be used to carry out this conversion. Both hardware and software options are available for use to perform CORDIC operations.

At element 206, the method 200 includes generating an up-sampled polar amplitude sample stream (UPASS) from a selectively inverted polar amplitude sample stream (SI-PASS). In at least one embodiment of the method 200, element 206 includes generating an up-sampled polar amplitude sample stream at least in part by (i) identifying an origin crossing of the data signal in the IQ plane and responsively adjusting an inversion trigger, (ii) selectively applying an inversion to the polar amplitude sample stream based on the inversion trigger to form a selectively inverted polar amplitude sample stream, (iii) interpolating the selectively inverted polar amplitude sample stream to form an interpolated selectively inverted polar amplitude sample stream (ISIPASS), and (iv) removing the inversion from the interpolated selectively inverted polar amplitude sample stream to form the up-sampled polar amplitude sample stream.

A first technique of identifying the origin includes identifying a π radian shift in the polar phase sample stream. The π radian shift occurs in consecutive samples of the polar phase sample stream. A second technique for identifying the origin crossing of the data signal in the IQ plane includes identifying the polar amplitude sample stream being less than a threshold amplitude value. In some embodiments, identifying the origin crossing of the data signal in the IQ plane includes identifying the polar amplitude sample stream being less than a threshold amplitude value for a plurality of consecutive samples. In some embodiments, identifying the origin crossing of the data signal in the IQ plane includes identifying a windowed average of the polar amplitude sample stream being less than a threshold amplitude value.

The inversion trigger is implemented as a two-state system including an active state and an inactive state, and adjusting the inversion trigger includes flipping the state of the inversion trigger from active to inactive or vice-versa. In at least one such embodiment, selectively applying the inversion to the polar amplitude sample stream based on the inversion trigger to form the selectively inverted polar amplitude sample stream includes (i) applying the inversion to the polar amplitude sample stream while the inversion trigger is in the active state and (ii) not applying the inversion to the polar amplitude sample stream while the inversion trigger is in the inactive state.

In some embodiments, interpolating the polar amplitude sample stream to form the interpolated selectively inverted polar amplitude sample stream includes (i) injecting 0-value (zero-value) samples into the selectively inverted polar amplitude sample stream, and (ii) applying a low-pass filter to the (injected) selectively inverted polar amplitude sample stream. The result of applying the low pass filter will be a polar amplitude sample stream—an interpolated selectively inverted sample stream—in which the injected 0-value samples have been changed and are meaningful interpolated values. However, the selectively inverted and interpolated polar amplitude sample stream still includes both positive and negative values. Therefore, the inversion made previously needs to be removed. Removing the inversion may be as simple as setting a sign bit for the encoded amplitude values in the polar amplitude sample stream to positive. In other embodiments, signal processing methods related to the processing used for encoding the amplitude values can be applied to remove the inversion and effectively generate an absolute value of the incoming sample stream. It may be the case that the inversion removal module operates on the entire sample stream or that the inversion removal module can be activated when processing previously inverted samples. The latter technique would require a method that allows the inversion removal module to communicate with the inversion trigger to establish proper timing and clocking.

At element 208, the method 200 includes modulating a carrier signal using the up-sampled polar amplitude sample stream and the polar phase sample stream. Together, the sample streams can characterize a QPSK modulation to be applied to the carrier signal.

Figure 3:
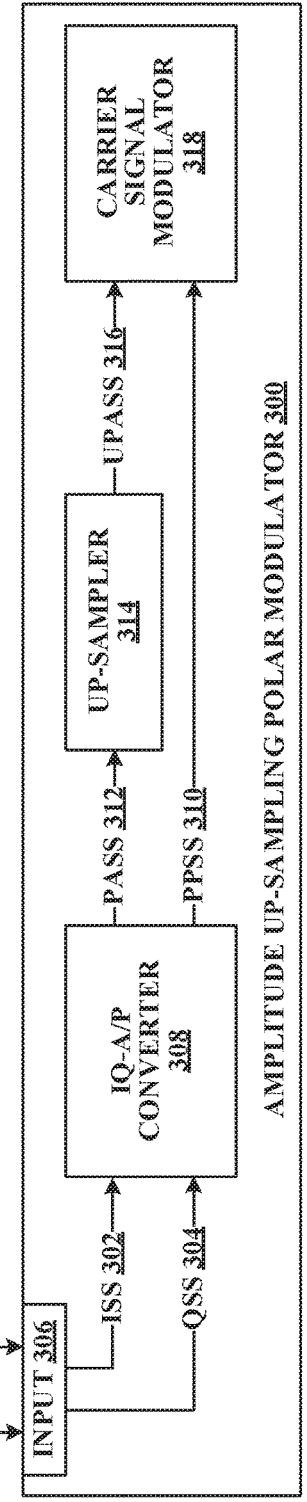
FIG. 3 is a block diagram of an amplitude up-scaling polar modulator in accordance with some embodiments.

FIG. 3 is a block diagram of an amplitude up-sampling polar modulator in accordance with some embodiments. In particular, FIG. 3 depicts an amplitude up-sampling polar modulator 300.

The amplitude up-sampling polar modulator 300 includes an input 306 that is depicted as receiving an in-phase sample stream (ISS) 302 and a quadrature sample stream (QSS) 304. The ISS 302 and the QSS 304 together characterize a data signal in an in-phase-quadrature (IQ) plane. The data signal carries information encoded via a quadrature modulation technique. Quadrature modulation makes use of Cartesian coordinates, x and y. When considering quadrature modulation, the x-axis is called the I (in-phase) axis, and the y-axis is called the Q (quadrature) axis.

The amplitude up-sampling polar modulator 300 includes a coordinate system converter such as an in-phase-quadrature to amplitude/phase (IQ-A/P) converter 308 that receives the QSS 304 and the ISS 302 and responsively generates a polar phase sample stream (PPSS) 310 and a polar amplitude sample stream (PASS) 312. Polar modulation is analogous to quadrature modulation in the same way that polar coordinates are analogous to Cartesian coordinates. Polar modulation makes use of polar coordinates, r (amplitude) and Θ (phase). Converting from a quadrature modulation schema to a polar modulation schema may be carried out via a plurality of known techniques. Mathematically, the process relies upon trigonometry. The tangent of the phase Θ is equivalent to the value of the quadrature component (Q) divided by the value of the in-phase component (I), while the amplitude r is given by the square root of the sum of the squares of the quadrature and in-phase components (Q and I, respectively). In at least one embodiment, the IQ-A/P converter 308 includes a CORDIC. In at least one embodiment, the IQ-A/P converter 308 includes a look-up table. For example, as one of ordinary skill in the art will appreciate, a CORDIC can implement a look-up table. In other embodiments, hard-wired logic replaces a look-up table in accordance with system requirements, such as reduced hardware costs.

In FIG. 3, an up-sampler 314 receives the PASS 312 and generates an up-sampled polar amplitude sample stream (UPASS) 316. Although not shown in FIG. 3, in certain embodiments (see, e.g., FIG. 5) the up-sampler 314 further receives the PPSS 310. In embodiments wherein the up-sampler 314 further receives the PPSS 310, the PPSS 310 is used for origin-crossing identification, instead of, or alongside, the PASS 312. Detailed information regarding the up-sampler 314 is provided in the descriptions of FIG. 4 and FIG. 5.

A carrier-signal modulator 318 receives the UPPSS 316 and the PPSS 310 from the IQ-A/P converter 108. At the carrier-signal modulator 318 data samples are encoded according to the PPSS 310, the UPASS 316, and a predetermined modulation technique. At least one embodiment of the amplitude up-sampling polar modulator 300 employs a quadrature phase-shift keying (QPSK) modulation technique at the carrier-signal modulator 318.

FIG. 4 is a block diagram of a first example of the up-sampler of FIG. 3 in accordance with some embodiments. FIG. 4 depicts example block diagram 400 of the up-sampler 314. In the up-sampling polar modulator 300, the carrier frequency may be high enough to require data stream up-sampling of the PASS 312 for proper modulation. The up-sampler 314 of FIG. 4 receives the PASS 312. The PASS 312 is input to an origin-crossing identifier 402. The origin-crossing identifier 402 identifies an origin crossing via observing the PASS 312 as less than a threshold amplitude value. The origin crossing identifier 402 searches for origin-crossings in the PASS 312 and, upon detection, responsively flips an inversion trigger 404. The inversion trigger 404 is a binary control bit that is input to a controlled inverter 406. The controlled inverter 406 selectively applies an inversion to the PASS 312 based on the state of the inversion trigger 404 and produces PASS 312A.

The selectively inverted PASS 312A is input to an interpolator 408. In one embodiment, the interpolator 408 includes (i) a 0-value (zero-value) injector configured to inject 0-value (zero-value) samples into the selectively inverted PASS 312A and (ii) a low-pass filter. The selectively inverted and interpolated PASS 312B (interpolated selectively inverted PASS 312B) is input to an inversion removal module 410 that removes the inversion made by the controlled inverter 406. The up-sampler 314 outputs the UPASS 316.

FIG. 5 is a block diagram of a second example of the up-sampler of FIG. 3 in accordance with some embodiments. FIG. 5 depicts example block diagram 500 of the up-sampler 314. In the up-sampling polar modulator 300, the carrier frequency may be high enough to require data stream up-sampling of the PASS 312 for proper modulation. The up-sampler 314 of FIG. 5 receives the PASS 312 as well as the PPSS 310. The PPSS 310 is input to an origin-crossing identifier 502. The origin-crossing identifier 502 identifies an origin crossing via observing the PPSS 310 undergoing a π radian shift between consecutive samples.

The origin crossing identifier 502 searches for origin-crossings in the PPSS 310 and, upon detection, responsively flips the inversion trigger 404. The inversion trigger 404 is a binary control bit that is input to the controlled inverter 406. The controlled inverter 406 selectively applies an inversion to the PASS 312 based on the state of the inversion trigger 404.

The selectively inverted PASS 312C is input to the interpolator 408. The selectively inverted and interpolated PASS 312D (interpolated selectively inverted PASS 312D) is input to an inversion removal module 410 that removes the inversion made by the controlled inverter 406. The up-sampler 314 outputs the UPASS 316.

FIG. 6 is a block diagram of an example of the interpolator of FIGS. 4 and 5. FIG. 6 depicts example block diagram 600 of the interpolator 408. In an embodiment, the interpolator 408 of FIG. 6 includes (i) a 0-value injector ("Zero-Value Injector) 602 configured to inject 0-value samples into the incoming selectively inverted PASS signal 312 (e.g., 312A in FIG. 4, 312C in FIG. 5), and (ii) a low-pass filter 604. The interpolator 408 forms, at the output of low-pass filter 604, the interpolated selectively inverted polar amplitude sample signal 312 (e.g., 312B in FIG. 4, 312D in FIG. 5). In at least one embodiment, the interpolator 408 interpolates the incoming selectively inverted PASS signal 312 (312A (312C)) using a poly-phase finite impulse response (FIR) filter.

In some embodiments, the selectively inverted and interpolated PASS signal 312 (312B (312D)) is output by the interpolator 408 for input to an inversion removal module (e.g., inversion removal module 410) as shown in FIGS. 4 and 5.

FIG. 7 depicts the controlled inverter and the inversion trigger of FIG. 4 (or FIG. 5) with the inversion trigger in an active state in accordance with some embodiments. In the scenario 700 depicted in FIG. 7 the inversion trigger 404 is in an active state and could be represented by the binary 1. The controlled inverter 406 includes an inverter 702 and a bypass 704. The PASS 312 is routed through the inverter 702. In the Scenario 700, the PASS 312 output (e.g., PASS 312A in FIG. 4, PASS 312C in FIG. 5) via the controlled inverter 406 is inverted.

FIG. 8 depicts the controlled inverter and the inversion trigger of FIG. 4 (or FIG. 5) with the inversion trigger in an inactive state in accordance with some embodiments. In the scenario 800 depicted in FIG. 8 the inversion trigger 404 is in an inactive state and could be represented by the binary 0. The controlled inverter 406 includes the inverter 702 and the bypass 704. The PASS 312 is routed through the bypass 704. In the Scenario 800, the PASS 312 output (e.g., PASS 312A in FIG. 4, PASS 312C in FIG. 5) via the controlled inverter 406 is not inverted.

That is, in some embodiments, the combined effect of FIGS. 7 and 8 is that the PASS 312 input to the controlled inverter 406 is selectively inverted, with the PASS 312 output (312A (312C)) being inverted (via the inverter 702) in FIG. 7 and not inverted (via the bypass 704) in FIG. 8, dependent on the state of the inversion trigger.

By toggling inversion of the PASS 312 in correspondence with origin crossings and likewise rapid dips and rises in amplitude values, modulator performance is increased via a more accurate interpolation process. High frequency information is reduced by inverting a signal at the perigee of a discontinuous cusp and consequently translating the signal into the negative range. Performing this process at each detected origin crossing results in a modulation that yields superior results.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   receiving an in-phase sample stream and a quadrature sample stream at a polar modulator, wherein the in-phase sample stream and the quadrature sample stream together characterize a data signal in an IQ plane;
   generating a polar amplitude sample stream and a polar phase sample stream based on the in-phase sample stream and the quadrature sample stream;
   generating an up-sampled polar amplitude sample stream at least in part by:
      identifying an origin crossing of the data signal in the IQ plane and responsively adjusting an inversion trigger;
      selectively applying an inversion to the polar amplitude sample stream based on the inversion trigger to form a selectively inverted polar amplitude sample stream;
      interpolating the selectively inverted polar amplitude sample stream to form an interpolated selectively inverted polar amplitude sample stream; and
      removing the inversion from the interpolated selectively inverted polar amplitude sample stream to form the up-sampled polar amplitude sample stream; and,
   modulating a carrier signal, at the polar modulator, using the up-sampled polar amplitude stream and the polar phase sample stream.

2. The method of claim 1, wherein the data signal is a QPSK data signal.

3. The method of claim 1, wherein generating the polar amplitude sample stream and the polar phase sample stream comprises employing a look-up table.

4. The method of claim 1, wherein generating the polar amplitude sample stream and the polar phase sample stream comprises employing a CORDIC.

5. The method of claim 1, wherein identifying the origin crossing of the data signal in the IQ plane comprises identifying a n radian shift in the polar phase sample stream.

6. The method of claim 1, wherein identifying the origin crossing of the data signal in the IQ plane comprises identifying the polar amplitude sample stream as being less than a threshold amplitude value.

7. The method of claim 1, wherein the inversion trigger is a two-state system, the two-state system comprising an active state and an inactive state, and wherein adjusting the inversion trigger comprises switching a state of the inversion trigger between the active state and the inactive state.

8. The method of claim 7, wherein selectively applying the inversion to the polar amplitude sample stream based on the inversion trigger comprises (i) applying the inversion to the polar amplitude sample stream while the state of the inversion trigger is in the active state, and (ii) not applying the inversion to the polar amplitude sample stream while the state of the inversion trigger is in the inactive state.

9. The method of claim 1, wherein interpolating the selectively inverted polar amplitude sample stream comprises:
   injecting zero-value samples into the selectively inverted polar amplitude sample stream; and,
   applying a low-pass filter to the selectively inverted polar amplitude sample stream.

10. The method of claim 1, wherein removing the inversion from the interpolated selectively inverted polar amplitude sample stream comprises taking an absolute value of the interpolated selectively inverted polar amplitude sample stream.

11. A polar modulator comprising:
    an input configured to receive an in-phase sample stream and a quadrature sample stream, wherein the in-phase sample stream and the quadrature sample stream together characterize a data signal in an IQ plane;
    a coordinate system converter configured to receive the in-phase sample stream and the quadrature sample stream from the input and to generate a polar amplitude sample stream and a polar phase sample stream;
    an up-sampler configured to receive the polar amplitude sample stream from the coordinate system converter and to generate an up-sampled polar amplitude sample stream, the up-sampler comprising:
       an origin-crossing identifier configured to identify an origin crossing of the data signal in the IQ plane and to responsively adjust an inversion trigger based on the identification of the origin crossing;
       a controlled inverter configured to selectively apply an inversion to the polar amplitude sample stream based on the inversion trigger to form a selectively inverted polar amplitude sample stream;
       an interpolator configured to receive the selectively inverted polar amplitude sample stream from the controlled inverter and to interpolate the selectively inverted polar amplitude sample stream to form an interpolated selectively inverted polar amplitude sample stream; and
       an inversion removal module configured to receive the interpolated selectively inverted polar amplitude sample stream from the interpolator and to remove the inversion to form the up-sampled polar amplitude sample stream; and,
    a carrier-signal modulator configured to receive the up-sampled polar amplitude sample stream and the polar phase sample stream and to modulate a carrier signal based on the up-sampled polar amplitude sample stream and the polar phase sample stream.

12. The polar modulator of claim 11, wherein the data signal is a QPSK data signal.

13. The polar modulator of claim 11, wherein the coordinate system converter comprises an IQ-A/P converter and is configured to employ a look-up table to generate the polar amplitude sample stream and the polar phase sample stream.

14. The polar modulator of claim 11, wherein the coordinate system converter comprises an IQ-A/P converter and is configured to employ a CORDIC to generate the polar amplitude sample stream and the polar phase sample stream.

15. The polar modulator of claim 1, wherein the up-sampler is further configured to receive the polar phase sample stream from the coordinate system converter and the origin-crossing identifier is further configured to identify a π radian shift in the polar phase sample stream.

16. The polar modulator of claim 11, the origin-crossing identifier is further configured to identify the polar amplitude sample stream as being less than a threshold amplitude value.

17. The polar modulator of claim 1, wherein the inversion trigger is a two-state system, the two-state system comprising an active state and an inactive state, and wherein the origin-crossing identifier being configured to responsively adjust the inversion trigger comprises the origin-crossing identifier being configured to switch a state of the inversion trigger between the active state and the inactive state.

18. The polar modulator of claim 17, wherein the controlled inverter comprises (i) an inverter configured to invert the polar amplitude sample stream while the state of the inversion trigger is in the active state and (ii) a bypass configured to transport the polar amplitude sample stream unmodified while the state of the inversion trigger is in the inactive state.

19. The polar modulator of claim 11, wherein the interpolator comprises:
  a zero-value injector, configured to inject zero-value samples into the selectively inverted polar amplitude sample stream; and,
  a low-pass filter.

20. The polar modulator of claim 11, wherein the inversion removal module is configured to set sign bits in the polar amplitude sample stream to positive.

\* \* \* \* \*